United States Patent
Nagasawa et al.

(10) Patent No.: US 10,654,384 B2
(45) Date of Patent: May 19, 2020

(54) SEAT

(71) Applicants: TACHI-S CO., LTD., Akishima-shi, Tokyo (JP); HONDA MOTOR CO., LTD., Minato-ku, Tokyo (JP)

(72) Inventors: Takahiko Nagasawa, Tokyo (JP); Tsutomu Fujikake, Tokyo (JP); Ryo Kurobe, Tokyo (JP); Taku Nagasawa, Saitama (JP); Tomoyuki Uemura, Saitama (JP); Kazuyuki Kaneko, Saitama (JP)

(73) Assignees: TACHI-S CO., LTD., Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/523,369

(22) PCT Filed: Nov. 24, 2015

(86) PCT No.: PCT/JP2015/082813
§ 371 (c)(1),
(2) Date: Apr. 29, 2017

(87) PCT Pub. No.: WO2016/084757
PCT Pub. Date: Jun. 2, 2016

(65) Prior Publication Data
US 2017/0253157 A1 Sep. 7, 2017

(30) Foreign Application Priority Data
Nov. 26, 2014 (JP) .................................. 2014-239353

(51) Int. Cl.
*B60N 2/60* (2006.01)
*B60N 2/58* (2006.01)
(Continued)

(52) U.S. Cl.
CPC ......... *B60N 2/6027* (2013.01); *B60N 2/5816* (2013.01); *B60N 2/5825* (2013.01);
(Continued)

(58) Field of Classification Search
CPC .. B60N 2/6027; B60N 2/5816; B60N 2/5825; B60N 2/5833; B60N 2/60; B60N 2/6018; B60N 2/6036; B60N 2/7005
(Continued)

(56) References Cited

U.S. PATENT DOCUMENTS

| | | | | |
|---|---|---|---|---|
| 5,820,213 A | * | 10/1998 | Severinski | A47C 31/023 297/218.5 |
| 5,967,603 A | * | 10/1999 | Genders | B60R 21/207 280/730.2 |
| 6,206,467 B1 | * | 3/2001 | Mense | B60N 2/58 297/218.2 |

(Continued)

FOREIGN PATENT DOCUMENTS

| | | | |
|---|---|---|---|
| JP | H04-39747 Y2 | | 9/1992 |
| JP | 1994-014628 | * | 4/1994 |

(Continued)

OTHER PUBLICATIONS

Office Action dated Dec. 12, 2017, in Japanese Patent Application No. 2014-239353.
(Continued)

*Primary Examiner* — Syed A Islam
(74) *Attorney, Agent, or Firm* — SGPatents PLLC

(57) ABSTRACT

The present invention provides a seat which is unlikely to cause wrinkles or slack in a surface cover thereof, makes surface cover attachment and detachment simple, and is also capable of withstanding long-term use. To this end, a second fastening part 50 for attachably/detachably connecting a cushion material 2 and a surface cover 4 to one another is formed as a zipper in a seat 1.

3 Claims, 7 Drawing Sheets

(51) Int. Cl.
  *B60N 2/70* (2006.01)
  *B61D 33/00* (2006.01)
(52) U.S. Cl.
  CPC ............ *B60N 2/5833* (2013.01); *B60N 2/60* (2013.01); *B60N 2/6018* (2013.01); *B60N 2/6036* (2013.01); *B60N 2/7005* (2013.01); *B60N 2/58* (2013.01); *B61D 33/0035* (2013.01)
(58) Field of Classification Search
  USPC ... 297/218.2, 228.13, 218.4, 452.61, 452.62, 297/228.12, 228.11, 228.1, 195.1–215.16
  See application file for complete search history.

(56) References Cited

U.S. PATENT DOCUMENTS

| | | | |
|---|---|---|---|
| 7,506,939 B2 * | 3/2009 | Brockschneider ... | B60N 2/5825 297/218.2 |
| 9,505,329 B2 * | 11/2016 | Mori .................... | B60N 2/5825 |
| 2002/0101109 A1 * | 8/2002 | Stiller ................. | B60N 2/5825 297/452.6 |
| 2006/0237986 A1 | 10/2006 | Brockschneider et al. | |

FOREIGN PATENT DOCUMENTS

| | | |
|---|---|---|
| JP | H06-14628 Y2 | 4/1994 |
| JP | H06-254268 A | 9/1994 |
| JP | 2013-022379 A | 2/2013 |

OTHER PUBLICATIONS

International Search Report from International Patent Application No. PCT/JP2015/082813, dated Feb. 23, 2016.
Office Action dated Sep. 10, 2018 in Chinese Patent Application No. 201580058843.

* cited by examiner

SEAT

TECHNICAL FIELD

The present invention relates to a seat which allows a surface cover to be detachably connected to a peripheral cover.

BACKGROUND ART

Japanese Examined Utility Model Application Publication No. 4-39747 (Patent Literature 1) relates to the above-described technical field. The seat disclosed in the publication includes a foamed cushion member molded into a seat shape, a bag-like covering body for covering the cushion member while being fixed thereto, a first cover serving as the surface cover for covering the front surface side of the covering body, a second cover serving as the peripheral cover for covering the rear side of the covering body, and a slide fastener for connecting the first and the second covers.

The seat is configured to allow the peripheral edge of the surface cover to be detachably connected to the peripheral edge of the peripheral cover with the slide fastener. Connection of the peripheral cover to the surface cover in the tension state may apply the load to the slide fastener, which is likely to cause damage to the slide fastener, or wrinkles and slack in the surface cover. Accordingly, there has been proposed the structure having the pulling-over part famed in the cushion member to which the surface cover is fastened through pulling-over with the hook-and-loop fastener, for example, magic fastener as disclosed in Japanese Unexamined Patent Application Publication No. 6-254268 (Patent Literature 2).

CITATION LIST

Patent Literature

PTL 1: Japanese Examined Utility Model Application Publication No. 4-39747
PTL 2: Japanese Unexamined Patent Application Publication No. 6-254268

SUMMARY OF INVENTION

Technical Problem

The structure having the surface cover fastened to the pulling-over part formed in the cushion member with the hook-and-loop fastener is likely to cause the hook-and-loop fastener of the surface cover to be fastened to the hook-and-loop fastener of the pulling-over part during detachment/attachment of the surface cover. In the aforementioned state, much time is required for the detachment/attachment operation owing to unsettled positioning for the fastening operation. Furthermore, if the surface cover is fastened in the unsettled fastening positioning state, wrinkles and slack may be generated in the surface cover, and the function of the hook-and-loop fastener will be deteriorated over the long-term use.

It is an object of the present invention to provide a seat which is unlikely to generate the wrinkles and slack in the surface cover, and structured to have the surface cover easily detachable, and to withstand the long-term use.

Solution to Problem

The present invention provides the seat which includes a surface cover of a seat section connected via a detachable first fastening part, and a second fastening part for detachably connecting a cushion member to the surface cover, which is disposed on a pulling-over part foamed by pulling over a part of the surface cover in a side of the cushion member. The second fastening part for detachably connecting the cushion member and the surface cover is foamed as a zipper.

The second fastening part of the seat for fastening the surface cover and the pulling-over part is formed as the zipper. This allows easy positioning between the zippers so that the second fastening part can be easily fastened. The positioning may be ensured by using the zipper, and accordingly, the outer appearance quality of the surface cover is improved without causing the wrinkles and slack therein. Furthermore, the second fastening part is fastened using the zipper, thus improving durability of the second fastening part.

Preferably, the detachable second fastening part includes a third fastener half part fixed to the cushion member in a recess, extending along the pulling-over part at the side of the cushion member, and a fourth fastener half part detachably connected to the third fastener half part, which is disposed on the surface cover, and stored in the recess.

The use of the structure allows storage of the second fastening part in the recess, and further prevents contact of the second fastening part with the buttocks or back of the occupant at the pulling-over part appropriately.

Preferably, the second fastening part is a zipper.

In such a case, the use of the zipper facilitates positional alignment for fitting by holding the fourth fastener half part at the opening side of the recess from above, resulting in improved workability.

Advantageous Effects of Invention

The present invention provides the seat which hardly causes the wrinkles and slack in the surface cover, allows the surface cover to be easily detachable, and withstands the long-term use.

DESCRIPTION OF EMBODIMENTS

Figure 1:
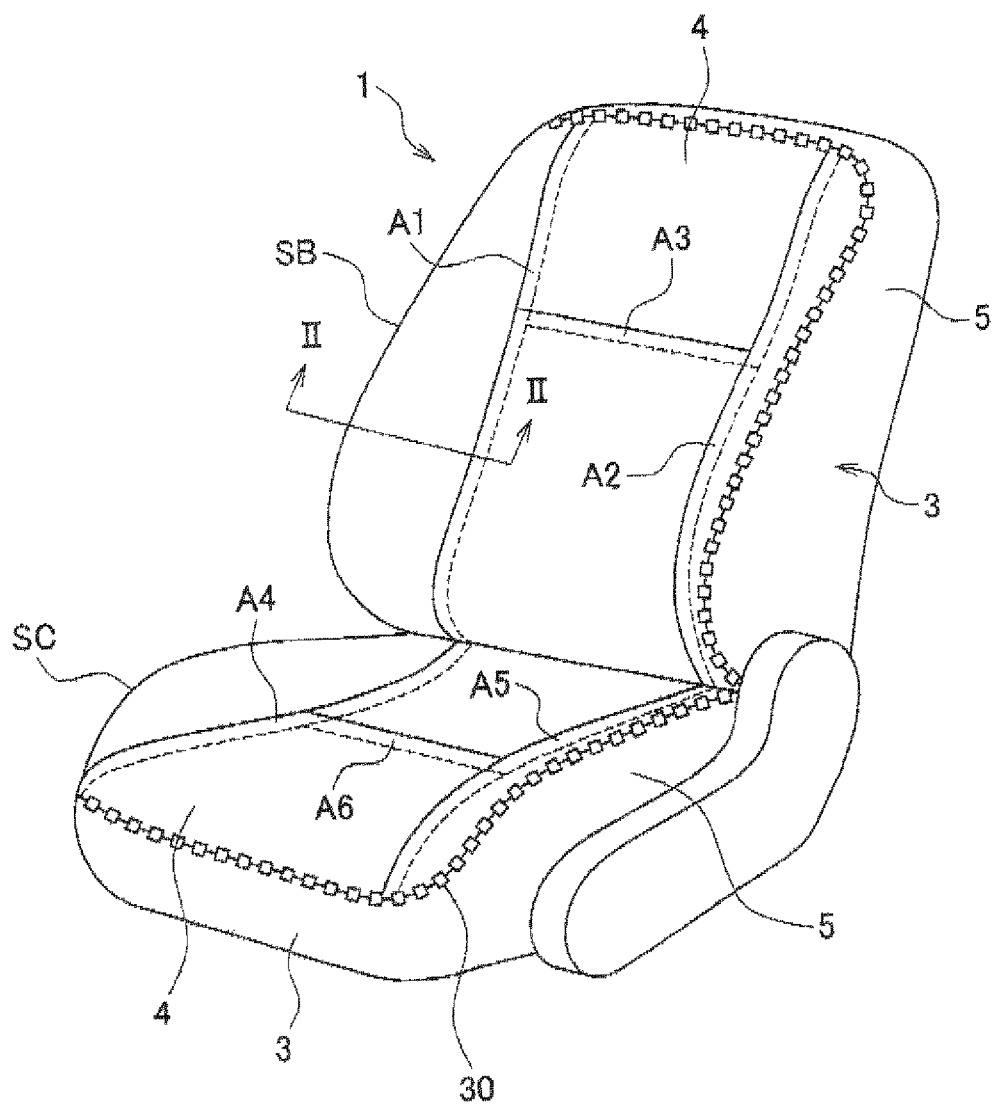
FIG. 1 is a perspective view showing a first embodiment of a seat according to the present invention.

Preferred embodiments of the seat according to the present invention will be described referring to the drawings.

As FIG. 1 shows, a vehicle seat 1 includes a seat cushion (seat section) SC which is movable back and forth on the floor panel, and a seat back (seat section) SB which is reclinable relative to the seat cushion SC. Each of the seat cushion SC and the seat back SB is famed by covering the surface of a cushion member 2 made of a foaming body with a skin 3. The skin 3 includes a surface cover 4 and a peripheral cover 5. The surface cover 4 serves to cover the seat cushion SC and the seat back SB separately.

Linear pulling-over parts A1 to A6 are formed on the seat cushion SC and the seat back SB of the seat 1. The pulling-over parts A1 to A6 form the outer appearance of the seat 1, and also prevent generation of the wrinkles or slack in the skin 3.

Figure 2:
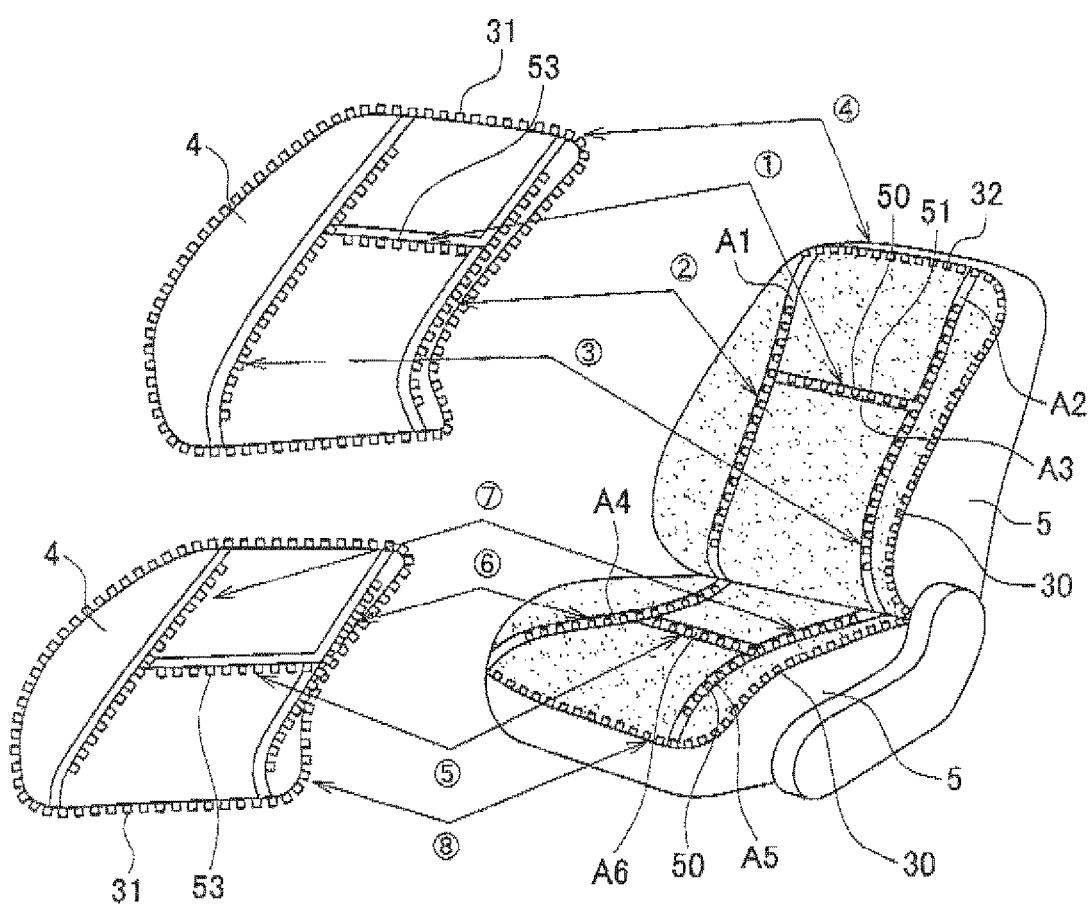
FIG. 2 is an exploded perspective view of the seat.
Figure 3:
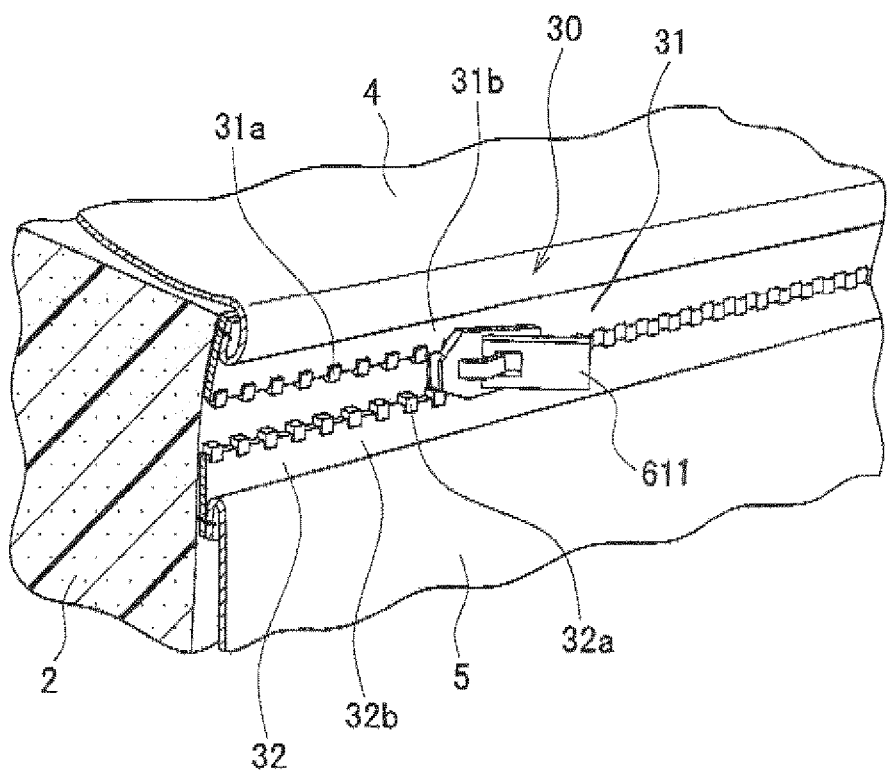
FIG. 3 is an enlarged perspective view of a principal part of a first fastening part.
Figure 4:
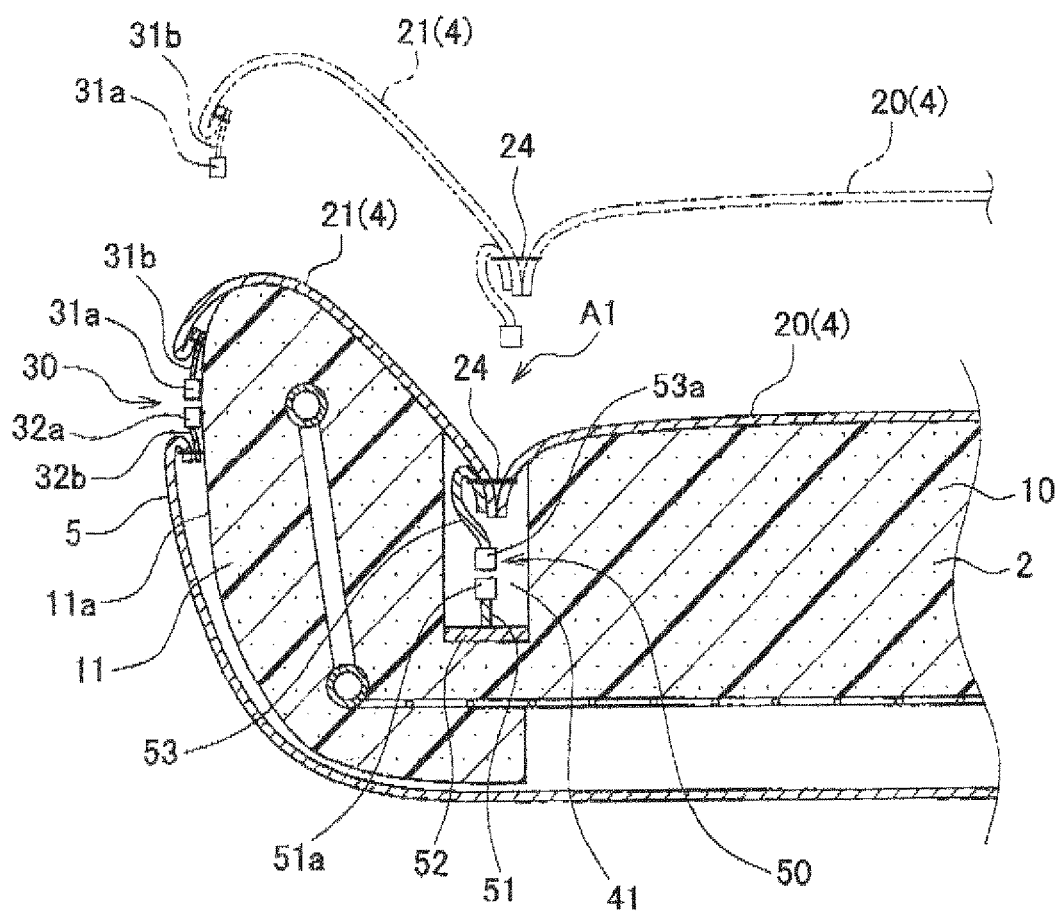
FIG. 4 is a sectional view taken along line II-II of FIG. 1.

The seat back SB will be described as an example. As FIGS. 2 to 4 show, the cushion member 2 of the seat back SB includes a main cushion part 10 for supporting the occupant's back from behind, and a side cushion part 11 for holding the occupant's back from the side.

The surface cover 4 is constituted by a main surface part 20 disposed on the main cushion part 10 of the cushion member 2, and a side surface part 21 disposed on the side cushion part 11. The main surface part 20 and the side surface part 21 of the skin 3 are sewn with a sewing part 24. The surface cover 4 and the peripheral cover 5 are connected on an outer side surface 11a of the side cushion part 11 with a first fastening part 30.

The detachable first fastening part 30 includes a first fastener half part 31 disposed while extending along the peripheral edge of the surface cover 4, and a second fastener half part 32 disposed while extending along the peripheral edge of the peripheral cover 5 so as to be detachably connected to the first fastener half part 31. A code number 611 denotes a pull tab for opening and closing the first fastening part 30.

The first fastening part 30 is famed as the zipper. The first fastener half part 31 is structured to have teeth 31a called element, which are arranged on a tape-like base material 31b. The second fastener half part 32 is also structured to have teeth 32a called element, which are arranged on a tape-like base part 32b. The base material 31b of the first fastener half part 31 is sewn to the peripheral edge of the surface cover 4, and the base part 32b of the second fastener half part 32 is sewn to the peripheral edge of the peripheral cover 5.

The pulling-over part A1 will be described.

Referring to FIG. 4, the pulling-over part A1 is provided with a second fastening part 50 for detachably connecting the cushion member 2 to the surface cover 4. The detachable second fastening part 50 includes a third fastener half part 51 which vertically extends along the pulling-over part A1 at the side of the cushion member 2, and is fixed thereto in a recess 41, and a fourth fastener half part 53 which is attached to the surface cover 4, and stored in the recess 41 so as to be detachably connected to the third fastener half part 51. The recess 41 with a predetermined depth is formed along a boundary between the main cushion part 10 and the side cushion part 11.

Figure 5:
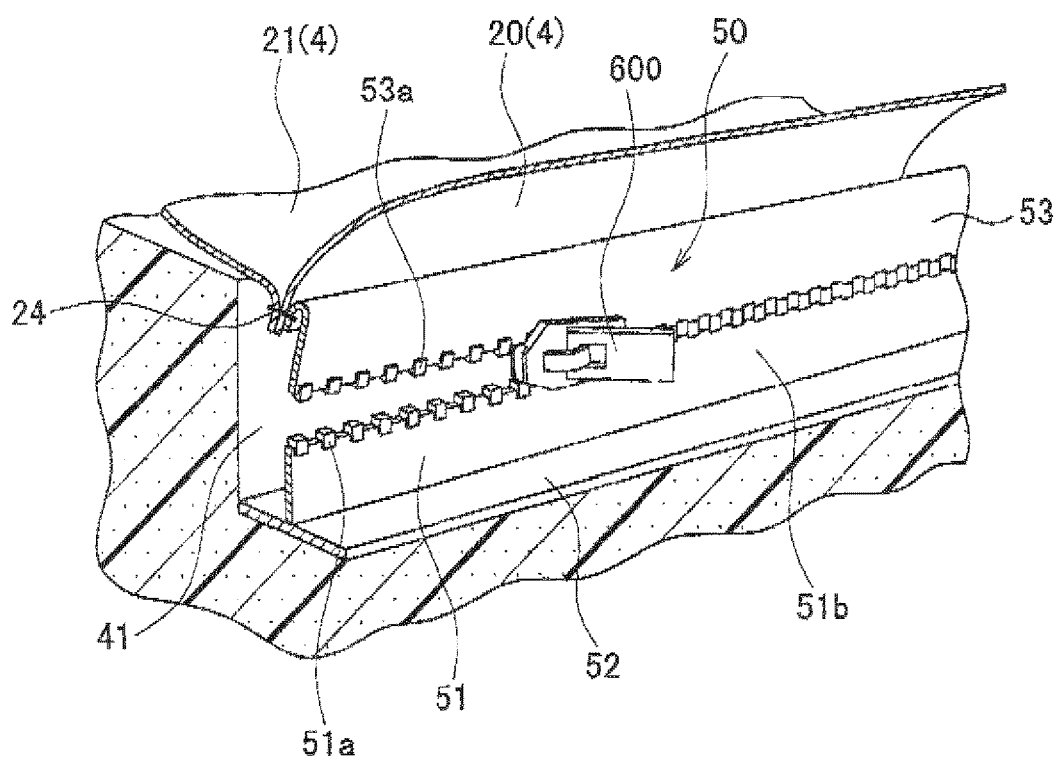
FIG. 5 is an enlarged perspective view of a principal part as shown in FIG. 4.

The second fastening part 50 is formed as the zipper as shown in FIG. 5. Referring to the second fastening part 50, the base end of a base material 51b of the third fastener half part 51 to be connected to the fourth fastener half part 53 is fixed to a resin base part 52 made of a long flat plate. In the case where the base material 51b is made of resin, the base material 51b may be integrated with the base part 52 while standing at the center of the base part 52. The bottom surface of the base part 52 is fixed onto the bottom surface of the recess 41 with the adhesive or double-sided tape. The use of the above-described base part 52 allows the third fastener half part 51 to be easily and securely fixed to the cushion member 2 with the adhesive and the double-sided tape.

The fourth fastener half part 53 is structured to have arranged teeth 53a called element. Likewise, the third fastener half part 51 is structured to have teeth 51a called element, which are arranged on the tape-like base material 51b. A code number 600 denotes a pull tab for opening and closing the second fastening part 50.

Each of the pulling-over parts A2, A3 (see FIG. 1) of the seat back SB has the similar structure to that of the pulling-over part A1, and explanations thereof, thus will be omitted.

The seat 1 is configured to have the first fastening part 30 and the second fastening part 50 which are detachable. This makes it possible to easily replace or clean the surface cover 4 in accordance with a season. The surface cover 4 and the peripheral cover 5 are connected with the detachable second fastening part 50. As a result, the load directly applied to the first fastening part 30 is appropriately reduced by the second fastening part 50. This makes it possible to prevent damage to the first fastening part 30, and to hardly cause the wrinkles and slack in the surface cover 4.

As the second fastening part 50 is foiled as the zipper, positional alignment may be easily made upon fastening of the fourth fastener half part 53 of the surface cover 4 to the third fastener half part 51 in the recess 41 through pulling-over of the surface cover 4, thus ensuring fastening at the predetermined position. Although the fastening and detachment/attachment operations are frequency performed, the structurally strong zipper may further improve durability without deteriorating the fastening function. Pulling-over of the surface cover 4 may be easily performed through fastening operation without requiring any tool.

The seat 1 has been described with respect to the seat back SB. As each of the first fastening part 30, the second fastening part 50, and the pulling-over parts A4 to A6 (see FIG. 1) of the seat cushion SC has the similar structure, the explanation thereof, thus will be omitted.

It is to be understood that the present invention is not limited to the aforementioned embodiment. For example, the seat according to the present invention is applicable to seats for automobile, airplane, passenger ship and the like.

Application example of the first fastening part will be described.

Figure 6:
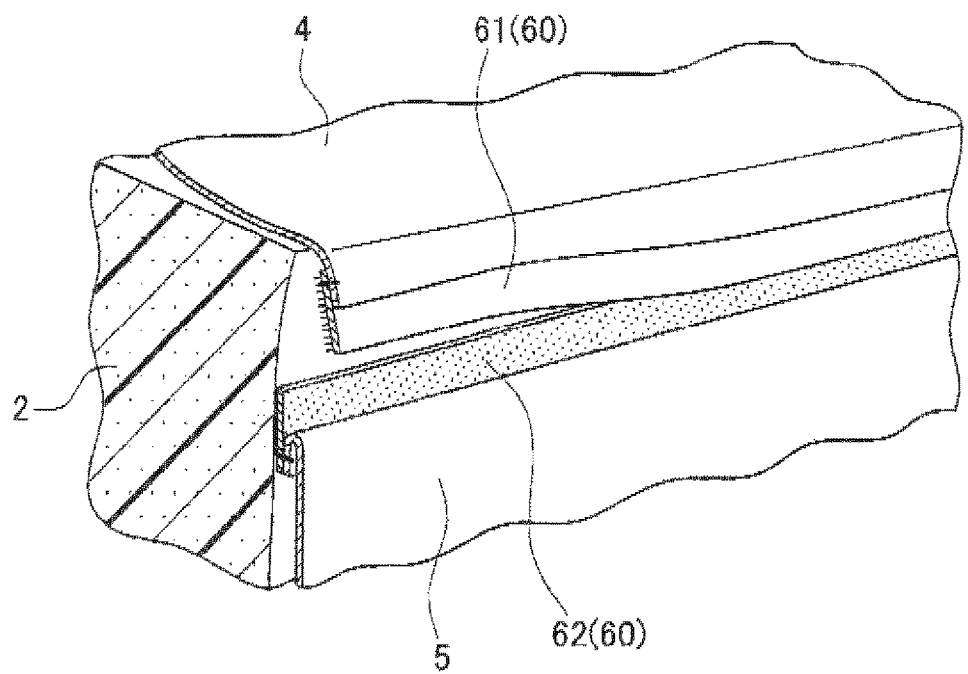
FIG. 6 is an enlarged perspective view of a principal part of a second embodiment of the seat according to the present invention.

As FIG. 6 shows, a first fastening part 60 is formed as a hook-and-loop fastener. A first fastener half part 61 constitutes a male portion, and is sewn to the peripheral edge of the surface cover 4. Likewise, a second fastener half part 62 constitutes a female portion, and is sewn to the peripheral edge of the peripheral cover 5.

Figure 7:
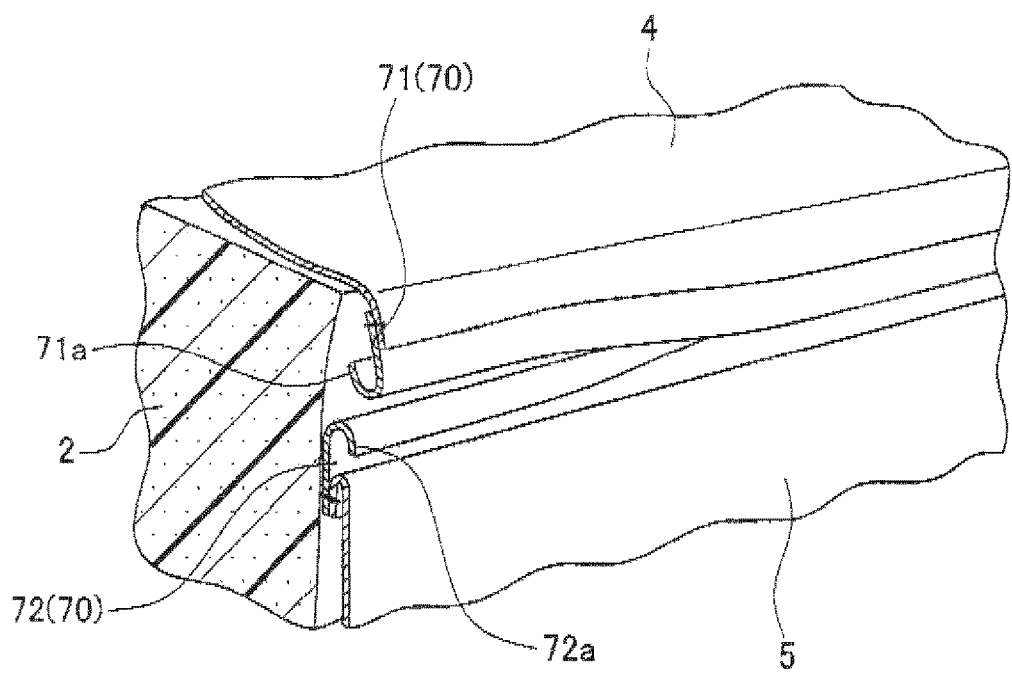
FIG. 7 is an enlarged perspective view of a principal part of a third embodiment of the seat according to the present invention.

As FIG. 7 shows, a first fastening part 70 is formed as a hook member capable of hooking. A first hook portion 71a with a U-like or a V-like cross section is attached to an end of a resin first fastener half part 71, and the base end of the first fastener half part 71 is sewn to the peripheral edge of the surface cover 4. Likewise, a second hook portion 72a with a U-like or a V-like cross section is attached to the end of a resin second fastener half part 72. The base end of the second fastener half part 72 is sewn to the peripheral edge of the peripheral cover 5.

The first hook portion 71a is hooked to the second hook portion 72a so as to connect the surface cover 4 to the peripheral cover 5. By strongly pulling the surface cover 4 in the hooked state as described above, the first hook portion 71a may be easily disengaged from the second hook portion 72a.

LIST OF REFERENCE SIGNS

1: seat,
2: cushion member,
3: skin,

4: surface cover,
5: peripheral cover,
30: first fastening part,
31: first fastener half part,
32: second fastener half part,
50: second fastening part,
51: third fastener half part,
53: fourth fastener half part,
60: first fastening part,
61: first fastener half part,
62: second fastener half part,
70: first fastening part,
71: first fastener half part,
72: second fastener half part,
A1-A6: pulling-over part,
SB: seat back (seat section),
SC: seat cushion (seat section)

The invention claimed is:

1. A seat comprising a cushion having a main cushion part and a side cushion part, a surface cover having a main surface part disposed on the main cushion part and a side surface part disposed on the side cushion part, and a peripheral cover disposed on an outer side surface of the side cushion part, wherein the side surface part of the surface cover and the peripheral cover are connected via a detachable first fastening part, the surface cover and the cushion are connected via a detachable second fastening part along a pulling-over part of the cushion, the second fastening part is a slide fastener including a first slide fastener half part having a first row of teeth and fixed to the cushion in a recess extending along the pulling-over part, a second slide fastener half part disposed on the surface cover and having a second row of teeth detachably engaged with the first row of teeth in the recess, and a pull tab for engaging and disengaging the first and second rows of teeth to fasten and unfasten the second fastening part, and the first slide fastener half part includes a resin member having an inverted T-shaped cross-section, and the resin member includes a resin base material projecting from an upper side of a longitudinally long flat resin plate integral with the base material, the resin base material having an upper edge portion extending along a longitudinal direction of the recess with the first row of teeth being mounted on the upper edge portion, and the flat resin plate having a lower side adhesively secured directly to a bottom surface of the recess.

2. The seat according to claim 1, wherein the first fastening part is a hook-and-loop fastener.

3. The seat according to claim 1, wherein the first fastening part is a hook fastener.

* * * * *